(12) United States Patent
Sarwer

(10) Patent No.: US 11,509,890 B2
(45) Date of Patent: Nov. 22, 2022

(54) METHODS AND APPARATUS FOR ENTROPY CODING AND DECODING ASPECTS OF VIDEO DATA

(71) Applicant: HFI Innovation Inc., Zhubei (TW)

(72) Inventor: Mohammed Golam Sarwer, San Jose, CA (US)

(73) Assignee: HFI Innovation Inc., Zhubei (TW)

( * ) Notice: Subject to any disclaimer, the term of this patent is extended or adjusted under 35 U.S.C. 154(b) by 0 days.

(21) Appl. No.: 16/516,957

(22) Filed: Jul. 19, 2019

(65) Prior Publication Data

US 2020/0036969 A1    Jan. 30, 2020

Related U.S. Application Data

(60) Provisional application No. 62/733,099, filed on Sep. 19, 2018, provisional application No. 62/702,435, filed on Jul. 24, 2018.

(51) Int. Cl.
| | |
|---|---|
| *H04N 19/11* | (2014.01) |
| *H04N 19/157* | (2014.01) |
| *H04N 19/593* | (2014.01) |
| *H04N 19/18* | (2014.01) |

(52) U.S. Cl.
CPC ........... *H04N 19/11* (2014.11); *H04N 19/157* (2014.11); *H04N 19/18* (2014.11); *H04N 19/593* (2014.11)

(58) Field of Classification Search
CPC .... H04N 19/11; H04N 19/157; H04N 19/593; H04N 19/18; H04N 19/70; H04N 19/91; H04N 19/159; H04N 19/176
See application file for complete search history.

(56) References Cited

U.S. PATENT DOCUMENTS

| | | | |
|---|---|---|---|
| 2012/0300839 A1 | 11/2012 | Sze et al. | |
| 2014/0126629 A1 | 5/2014 | Park et al. | |
| 2016/0373742 A1* | 12/2016 | Zhao | H04N 19/593 |
| 2017/0041613 A1* | 2/2017 | Misra | H04N 19/117 |
| 2018/0063553 A1* | 3/2018 | Zhang | H04N 19/593 |

(Continued)

FOREIGN PATENT DOCUMENTS

| | | |
|---|---|---|
| CN | 104041033 A | 9/2014 |
| CN | 104081773 A | 10/2014 |

(Continued)

OTHER PUBLICATIONS

International Search Report and Written Opinion for International Application No. PCT/CN2019/097483 dated Sep. 27, 2019.

(Continued)

*Primary Examiner* — Nasim N Nirjhar
(74) *Attorney, Agent, or Firm* — Wolf, Greenfield & Sacks, P.C.

(57) ABSTRACT

The techniques described herein relate to methods, apparatus, and computer readable media configured to encode and/or decode video data. A prediction mode is determined for intra prediction coding a current data unit, where the determined prediction mode is a most probable mode of a plurality of most probable modes determined for the current data unit. The MPM information of the determined prediction mode is encoded using a coding bin, including context encoding the bin based on whether the bin is a first coding bin for the MPM information.

10 Claims, 17 Drawing Sheets

(56) References Cited

U.S. PATENT DOCUMENTS

| | | | |
|---|---|---|---|
| 2020/0021806 A1* | 1/2020 | Kim | H04N 19/105 |
| 2020/0021807 A1* | 1/2020 | Kim | H04N 19/91 |
| 2020/0195960 A1* | 6/2020 | Zhang | H04N 19/159 |
| 2020/0413045 A1* | 12/2020 | Zhang | G06F 1/03 |

FOREIGN PATENT DOCUMENTS

| | | |
|---|---|---|
| CN | 107736022 A | 2/2018 |
| EP | 2621175 A2 | 7/2013 |
| EP | 3 311 568 A2 | 4/2018 |
| WO | WO 2017/196957 A1 | 11/2017 |

OTHER PUBLICATIONS

Bross et al., Versatile Video Coding (Draft 2). Joint Video Exploration Team (JVET) of ITU-T SG 16 WP 3 and ISO/IEC JTC1/SC29/WG11 Document JVET-K1001-v6. Jul. 10-Jul. 18, 2018;6:138 pages.

Bross et al., Versatile Video Coding (Draft 4). Joint Video Exploration Team (JVET) of ITU-T SG 16 WP 3 and ISO/IEC JTC1/SC29/WG11 Document JVET-M1001-v7. Jan. 9-Jan. 18, 2019;7:299 pages.

Seregin et al., Neighbor Based Intra Most Probable Modes List Derivation. Joint Video Exploration Team (JVET) of ITU-T SG 16 WP 3 and ISO/IEC JTC 1/SC29/WG11 Document JVET-C0055. May 26-Jun. 1, 2016:4 pages.

PCT/CN2019/097483, Sep. 27, 2019, International Search Report and Written Opinion.

Extended European Search Report for European Application No. 19841880.8 dated Mar. 21, 2022.

Chen et al., Algorithm Description of Joint Exploration Test Model 7 (JEM 7). International Organization for Standardization. ISO/IEC JTC1/SC29/WG11. Coding of Moving Pictures and Audio. N17055. Jul. 2017. 48 pages.

Chien et al., Non-CE6: Intra mode coding simplification. Joint Collaborative Team on Video Coding (JCT-VC) of ITU-T SG16 WP3 and ISO/IEC JTC1/SC29/WG11. Feb. 2012. 3 pages.

Fukushima et al., Non-CE6 cross-verification of Qualcomm's intra mode coding simplification. Joint Collaborative Team on Video Coding (JCT-VC) of ITU-T SG16 WP3 and ISO/IEC JTC1/SC29/WG11. JCTVC-H0563. Feb. 2012. 3 pages.

Sarwer et al., CE3-related: Intra mode coding. Joint Video Experts Team (JVET) of ITU-T SG 16 WP 3 and ISO/IEC JTC 1/SC 29/WG 11. Jul. 2018. 8 pages.

* cited by examiner

| List | Index | Binarization | | | | | |
|---|---|---|---|---|---|---|---|
| MPM Modes | 0 | 1 | | | | | |
| | 1 | 0 | 1 | | | | |
| | 2 | 0 | 0 | 1 | | | |
| | 3 | 0 | 0 | 0 | 1 | | |
| | 4 | 0 | 0 | 0 | 0 | 1 | |
| | 5 | 0 | 0 | 0 | 0 | 0 | |

FIG. 7A

| MPM Index | Binarization |
|---|---|
| 0 | 1 |
| 1 | 01 |
| 2 | 001 |
| 3 | 0001 |
| 4 | 00001 |
| 5 | 00000 |

FIG. 7B

| MPM Index | Binarization |
|---|---|
| 0 | 1 |
| 1 | 01 |
| 2 | 0000 |
| 3 | 0001 |
| 4 | 0010 |
| 5 | 0011 |

| MPM Index | Binarization |
|---|---|
| 0 | 1 |
| 1 | 01 |
| 2 | 001 |
| 3 | 0001 |
| 4 | 0000 |

FIG. 7D

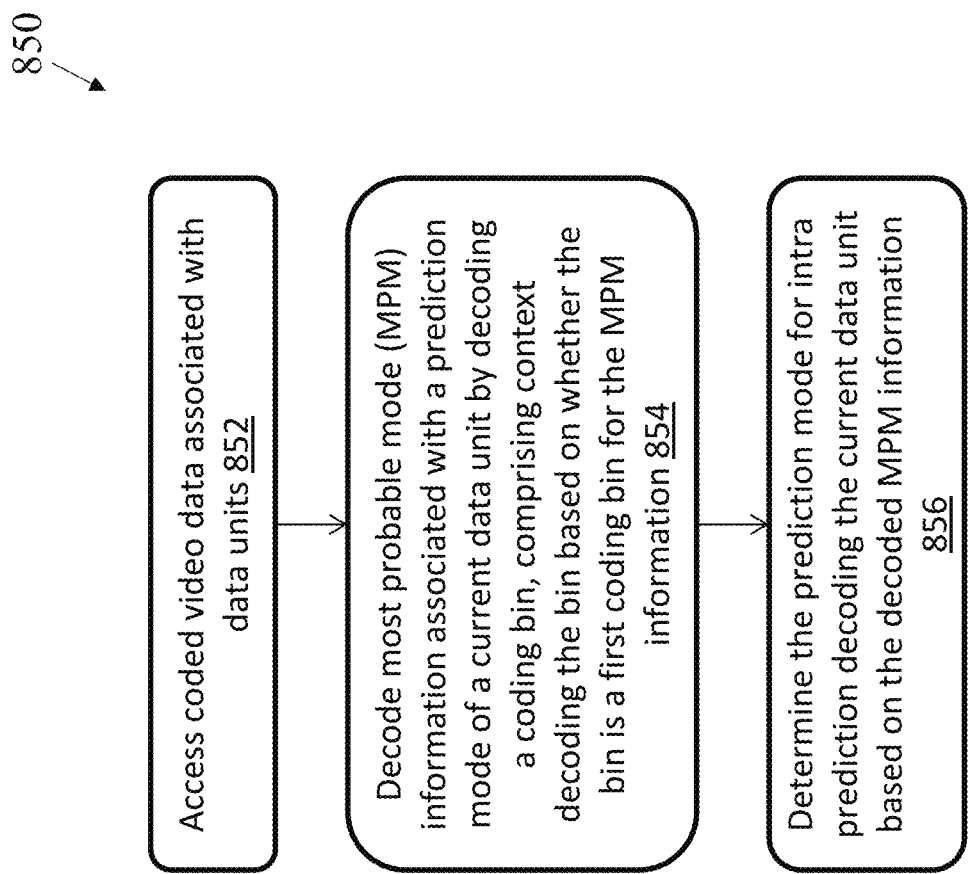

METHODS AND APPARATUS FOR ENTROPY CODING AND DECODING ASPECTS OF VIDEO DATA

RELATED APPLICATIONS

This Application claims priority under 35 U.S.C. § 119(e) to U.S. Provisional Application Ser. No. 62/702,435, filed on Jul. 24, 2018 and entitled "SIMPLIFIED INTRA MODE CODING," and to U.S. Provisional Application Ser. No. 62/733,099, filed on Sep. 19, 2018 and entitled "COEFFICIENT CODING," which are herein incorporated by reference in their entirety.

TECHNICAL FIELD

The techniques described herein relate generally to entropy coding and decoding aspects of video data, and particularly to coding transform coefficients and intra mode prediction modes.

BACKGROUND OF INVENTION

Various video coding techniques can be used to encode video, such as for storage and/or transmission. The video coding techniques can also provide for decoding the encoded video for playback. A video codec can include an electronic circuit and/or software that compresses and/or decompresses digital video. Various video coding standards exist, and video codecs typically comply with one or more video coding standards. For example, High-Efficiency Video Coding (HEVC), is an international video coding standard developed by the Joint Collaborative Team on Video Coding (JCT-VC). As another example, the Versatile Video Coding (VVC) Video Coding Standard is another international video coding standard under development by the Joint Video Experts Team (JVET). Many video coding standards, including HEVC and VVC, use spatial and temporal compression. The compression process can encode video data by generating residual data that can be transformed, quantized, and entropy coded to generate the resulting bit stream, and likewise decoded by entropy decoding the bit stream, inverse quantizing and inverse transforming the data to reconstruct the residual data, and ultimately the picture.

SUMMARY OF INVENTION

In accordance with the disclosed subject matter, apparatus, systems, and methods are provided for immersive media content overlays.

Some embodiments relate to an encoding method for encoding video data. The method includes determining a prediction mode for intra prediction encoding a current data unit, wherein the determined prediction mode is a most probable mode (MPM) of a plurality of most probable modes determined for the current data unit, and encoding MPM information of the determined prediction mode using a coding bin, comprising context encoding the bin based on whether the bin is a first coding bin for the MPM information.

In some examples, encoding the MPM information using the coding bin includes, if the coding bin is a first bin, context encoding the coding bin.

In some examples, encoding the MPM information using the coding bin includes, if the coding bin is a second or greater bin, bypass encoding the coding bin.

In some examples, the MPM information includes an index indicating a position in a MPM list associated with the plurality of MPMs, and the index is encoded by using truncated unary binarization.

In some examples, the method includes determining a prediction mode for intra prediction coding a second data unit, wherein the determined prediction mode is not a most probable mode in a current list of a plurality of most probable modes, and encoding the determined prediction mode using a fixed length code.

Some embodiments relate to an encoding method for encoding video data. The method includes determining, for a current coefficient group of transform coefficients, a context model from a plurality of context models based on a plurality of neighboring coefficient groups of transform coefficients, and encoding the a current coefficient group of transform coefficients using the determined context model.

In some examples, determining the context model based on the plurality of neighboring coefficient groups of transform coefficients includes determining the plurality of neighboring groups of transform coefficients based on whether the current coefficient group of transform coefficients are transform skip coded.

In some examples, the method includes determining a number of the plurality of neighboring groups of transform coefficients, a position of each of the plurality of neighboring groups of transform coefficients, or both, based on whether the current coefficient group of transform coefficients are transform skip coded.

In some examples, the method includes determining the context model based on three neighboring coefficient groups of transform coefficients.

In some examples, the method includes determining the context model based on five neighboring coefficient groups of transform coefficients.

In some examples, the method includes determining the context model from a plurality of context models comprises determining the context model from four context models, determining the context model from six context models, or some combination thereof.

In some examples, encoding the current coefficient group of transform coefficients using the determined context model includes encoding one or more of: a first flag indicative of whether at least transform coefficient of the current coefficient group of transform coefficients has a non-zero value; a second flag indicative of whether a transform coefficient of the current coefficient group of transform coefficients has a zero value; a third flag indicative of whether an absolute value of a transform coefficient of the current coefficient group of transform coefficients is greater than one; a fourth flag indicative of a parity of a transform coefficient of the current coefficient group of the transform coefficients; and a fifth flag indicative of whether the absolute value of a transform coefficient of the current coefficient group of transform coefficients is greater than three.

Some aspects relate to a decoding method for decoding video data. The method includes decoding most probable mode (MPM) information associated with a prediction mode of a current data unit by decoding a coding bin, comprising context decoding the bin based on whether the bin is a first coding bin for the MPM information, and determining the prediction mode for intra prediction decoding the current data unit based on the decoded MPM information.

In some examples, decoding the MPM information by decoding the coding bin includes, if the coding bin is a first bin, context decoding the coding bin.

In some examples, decoding the MPM information by decoding the coding bin includes, if the coding bin is a second or greater bin, bypass decoding the coding bin.

In some examples, the MPM information includes an index indicating a position in a MPM list associated with a plurality of MPMs determined for the current data unit, and the index is decoded by using truncated unary de-binarization.

Some embodiments relate to a decoding method for decoding video data. The method includes decoding data associated with a current coefficient group of transform coefficients coded using a context model, wherein the context model was determined from a plurality of context models based on a plurality of neighboring coefficient groups of transform coefficients.

In some examples, the method includes determining the plurality of neighboring groups of transform coefficients based on whether the current coefficient group of transform coefficients are transform skip coded.

Some aspects relate to an apparatus configured to decode video data. The apparatus includes a processor in communication with memory, the processor being configured to execute instructions stored in the memory that cause the processor to decode an index that indicates a position in a list of a plurality of most probable modes, including decoding the most probable mode (MPM) information associated with a prediction mode of a current data unit by decoding a coding bin, wherein the bin is context decoded based on whether the bin is a first coding bin for the MPM information, and to determine the prediction mode for intra prediction decoding the current data unit based on the decoded MPM information.

Some aspects relate to an apparatus configured to decode video data. The apparatus includes a processor in communication with memory, the processor being configured to execute instructions stored in the memory that cause the processor to decode data associated with a current coefficient group of transform coefficients coded using a context model, wherein the context model was determined from a plurality of context models based on a plurality of neighboring coefficient groups of transform coefficients.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIGS. 7A-7C show tables of binarizations that can be used for six most probable mode indexes, according to some embodiments.

FIG. 7D shows a table of binarizations that can be used for five most probable mode indexes, according to some embodiments.

FIG. 8B shows an exemplary computerized method for decoding video data, according to some embodiments.

DETAILED DESCRIPTION OF INVENTION

Figure 1:
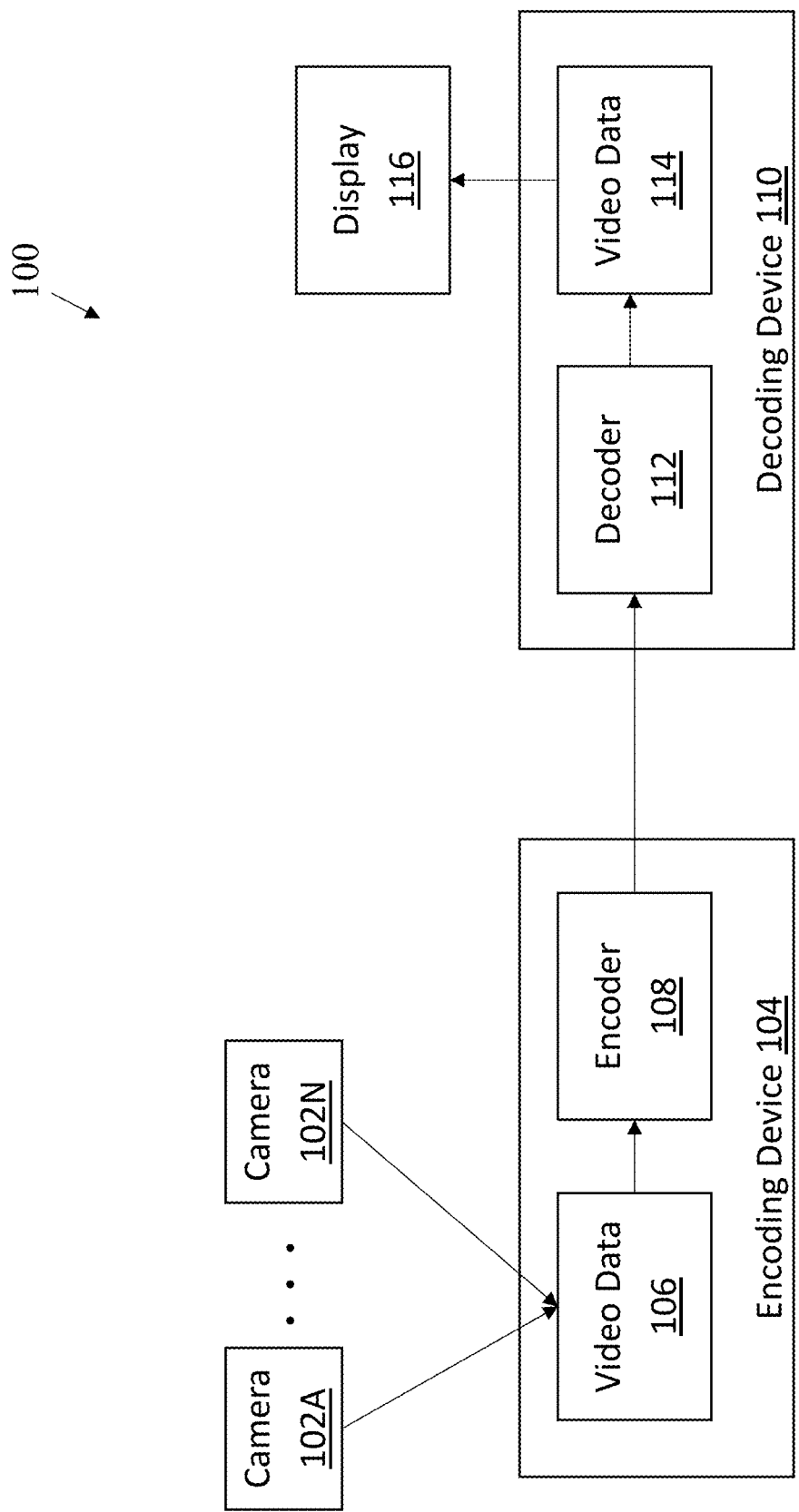
FIG. 1 shows an exemplary video coding configuration, according to some embodiments.

Various techniques can be used for intra prediction, including numerous intra prediction directions. Typically, a video encoder signals the intra prediction mode. For example, to signal a most probable mode (MPM) in the MPM list, video encoders bypass encoded the MPM information comprising an index indicating the MPM list position, such that none of the bins for the MPM information are context coded. The inventors have discovered and appreciated various deficiencies with existing techniques for coding the intra prediction mode. For example, not using any context coding to signal the MPM information results in coding inefficiencies, especially for the first index which is typically used the most of the indices. The inventors have developed techniques for signaling the MPM information of the intra prediction mode that address these and other deficiencies. The techniques described herein provide for using truncated unary binarization for MPM index. The first bin of the MPM information can be context coded, while the remaining bins can be bypass coded. Such context coding design can improve the coding efficiency of the intra prediction mode signaling. In some embodiments, non-MPM modes can be signaled using a fixed length code.

Various techniques can be used for coefficient coding to signal the residual transform/quantized data. For example, the encoder can signal various flags for the coefficients, such as on a per-coding group (CG) basis. However, the inventors have appreciated that only two context models are often used to code some flags, which can result in coding inefficiencies. Further, the inventors have appreciated that some flags are coded based on a set number of neighboring coefficient groups, such as five neighboring coefficient groups. The inventors have developed techniques for signaling the residual transform/quantized data that address these and other deficiencies. In some embodiments, the techniques can include determining the number of and/or position of the neighboring coefficient groups to use to code a particular coefficient group. In some embodiments the techniques determine which neighboring coefficient groups to use based on whether the associated coding unit was coded using transform skip or a transform. For example, five neighboring CGs can be used for a CU that is transform coded, while three neighboring CGs can be used for a CU that is not transform coded. The techniques can allow for using different numbers of, and/or locations of, neighboring coding groups as necessary, which can increase coding flexibly and improve coding efficiency.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. The video coding configuration 100 includes one or more cameras 102A-102N, collectively referred to as cameras 102, that generate video data 106. The cameras 102 can be any type of camera, such as cameras that include audio recording capabilities, and/or separate cameras and audio recording functionality. The encoding device 104 includes an encoder 108. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a portion of a head-worn display, or any other apparatus with decoding capability. The decoding device 110 includes a decoder 112 that is configured to decode the encoded video to generate video data 114. The display 116 displays the video data 114.

Figure 2:
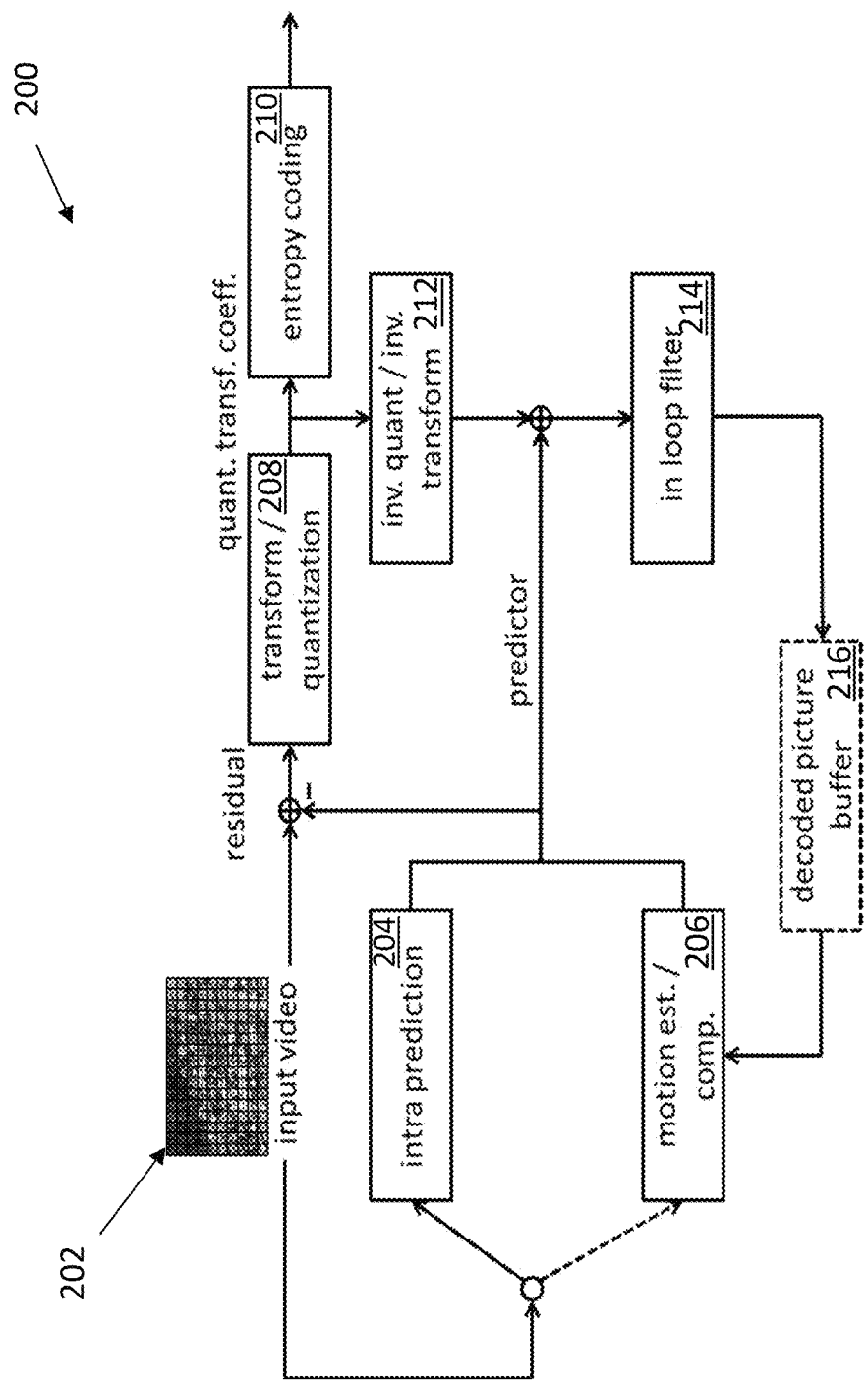
FIG. 2 shows aspects of an exemplary video encoder, according to some embodiments.

FIG. 2 shows aspects of an exemplary video encoder 200, according to some embodiments. The video encoder 200 receives the input video 202 and includes intra prediction 204 and motion estimation motion compensation 206 (for inter prediction), a transform & quantization unit 208, an entropy coding unit 210, an inverse quantization & transform unit 212, an in-loop filter 214, and a decoded picture buffer 216. In other embodiments, the video encoder 200 may include more, fewer, and/or different components than those illustrated in FIG. 2.

Figure 4:
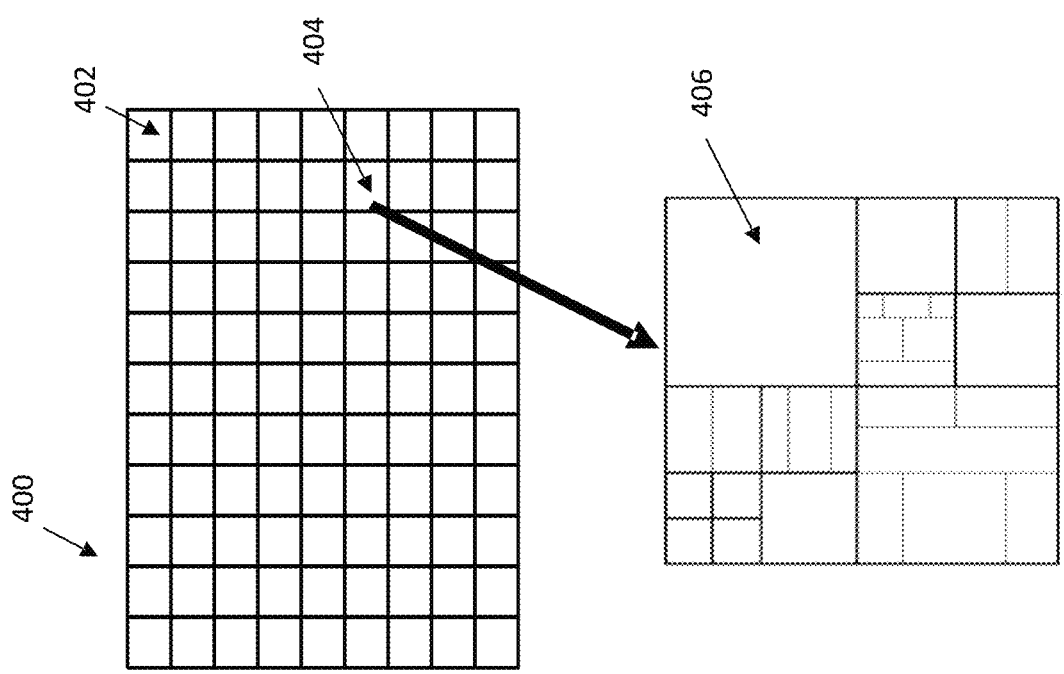
FIG. 4 shows a picture divided into coding tree units (CTUs), according to some examples.

For block-based motion compensation, as shown in FIG. 4, a picture 400 can be divided into 128×128 coding tree units (CTUs) as shown by CTUs 402 and 404. A CTU is divided further into coding units (CUs), which can be a 2N×2N square block, however, the size and the shape of a CU is not limited thereto. FIG. 4 shows, for example, the CTU 404 being divided into several CUs, including CU 406. The video encoder 200 may encode CUs.

The encoder can perform inter prediction using the motion estimation and compensation unit 206. The inter prediction processing can include generating predictive data by performing inter prediction on each CU. Depending on the type of inter prediction, the motion estimation and compensation unit 206 may search reference samples from the decoded picture buffer 216. The motion estimation and compensation unit 206 can generate reference picture indexes for the positions in the decoded picture buffer 216, and can generate motion vectors to indicate displacements between the reference location and a sample block of the CU. The motion estimation and compensation unit 206 can generate the predictive sample blocks of the CU based at least in part on actual or interpolated samples at the reference region indicated by the motion vector of the CU.

The encoder 200 can perform intra prediction using intra prediction unit 204. The intra prediction processing can include generating predictive data for a CU by performing intra prediction. The predictive data for the CU may include predictive blocks for the CU and various syntax elements. The intra prediction unit 204 may select the predictive data for CUs from among the predictive data generated by inter prediction processing or the predictive data generated by intra prediction processing.

The transform & quantization unit 208 can generate transform coefficients for each transform unit (TU) of a CU by applying a transform mode (e.g., DCT, DST or any other type of transform), and can quantize the transform coefficients. The entropy coding unit 210 entropy codes the quantized transform coefficients, such as by performing a Context-Adaptive Binary Arithmetic Coding (CABAC) on the quantized transform coefficients and/or any other side information for generating the bit stream. The encoder 200 can output the entropy-coded transform coefficients in a bit stream.

The inverse transform & quantization unit 212 can apply inverse quantization and inverse transform mode transforms (e.g., inverse DCT, DST or any other type of inverse transform) to reconstruct a residual block from the coefficient block. The in-loop filter 214 can perform an in-loop filtering technique. For example, the in-loop filter can include a sample adaptive offset (SAO) process that classifies reconstructed samples into different categories, obtaining an offset for each category, and then adding the offset to each sample of the category. The offset of each category can be signaled to the decoder to reduce sample distortion.

The decoded picture buffer 216 can store the reconstructed, SAO processed, blocks. As described herein, the motion estimation and compensation unit 206 can use the reconstructed blocks to perform intra prediction.

Figure 3:
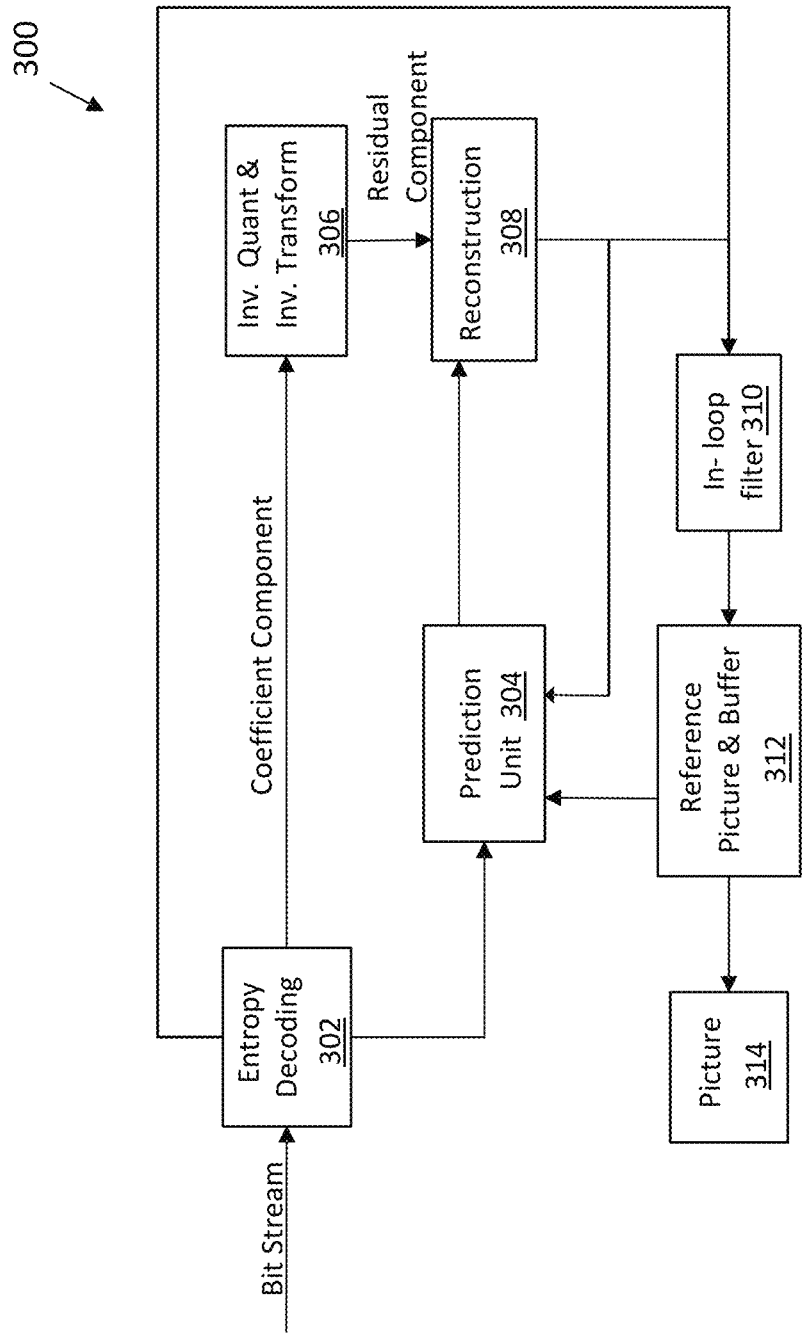
FIG. 3 shows aspects of an exemplary video decoder, according to some embodiments.

FIG. 3 shows aspects of an exemplary decoder 300, according to some embodiments. The decoder 300 includes at least some of an entropy decoding unit 302, a prediction unit 304, an inverse quantization and inverse transform unit 306, a reconstruction unit 308, an in-loop filter 310, and a reference picture and buffer 312. In other embodiments, the video decoder 300 may include more, fewer, and/or different components than those illustrated in FIG. 3.

The entropy decoding unit 302 parses the bit stream to decode the syntax elements. The prediction unit 304 can construct one or more reference picture lists using syntax elements signaled in the bit stream. The prediction unit 304 can perform motion compensation and/or intra prediction.

For example, if a CU is encoded using inter prediction, the prediction unit 304 may extract motion information for the CU, which can be used to determine one or more reference regions for the CU. The prediction unit 304 can generate, based on samples blocks at the one or more reference blocks, predictive blocks for the CU. As another example, if a CU is encoded using intra prediction, the prediction unit 304 can perform intra prediction to generate predictive blocks for the CU based on neighboring CUs.

The inverse quantization and inverse transform unit 306 may inverse quantize a coefficient block and may apply an inverse transform to generate a residual block. The reconstruction unit 308 may reconstruct the coding blocks.

Reconstruction unit 308 may use the transform block (e.g., luma and chroma transform blocks) associated with TUs of a CU and the predictive blocks (e.g., luma and chroma predictive blocks), e.g., either intra-prediction data and/or inter-prediction data, as applicable, to reconstruct the coding blocks (e.g., luma, Cb and Cr coding blocks). For example, reconstruction unit 308 may add samples (residual component) of the transform blocks, such as luma, Cb and Cr transform blocks, to corresponding samples (predictor component) of the predictive blocks to reconstruct the CU.

The in-loop filter 310 can use the offset of each SAO category (e.g., which can be signaled to the decoder 300) to reduce sample distortion. The reference picture and buffer 312 can store the resulting deblocked, SAO processed coding blocks. The buffer can provide reference pictures for subsequent motion compensation, intra prediction, and presentation of pictures as shown via picture 314.

Intra prediction can be a significant coding technique to reduce the spatial redundancy between the neighboring pixels of the image. The up-coming Video Coding Standard VVC includes two test models, namely the Versatile Video Coding Test Model (VTM) and the Bench-Mark Test Set (BMS). These test models are described in, for example, JVET-M1001-v7, "Versatile Video Coding (Draft 4), $13^{th}$ Meeting: Marrakech, M A, Jan. 9-18, 2019, which is hereby incorporated by reference herein in its entirety. A total of 67 intra prediction modes can be used for the BMS test model, whereas a total of 35 intra prediction modes are available for the VTM test model. Due to this large number of intra prediction modes, it is desirable to use an efficient intra mode coding method.

Figure 5:
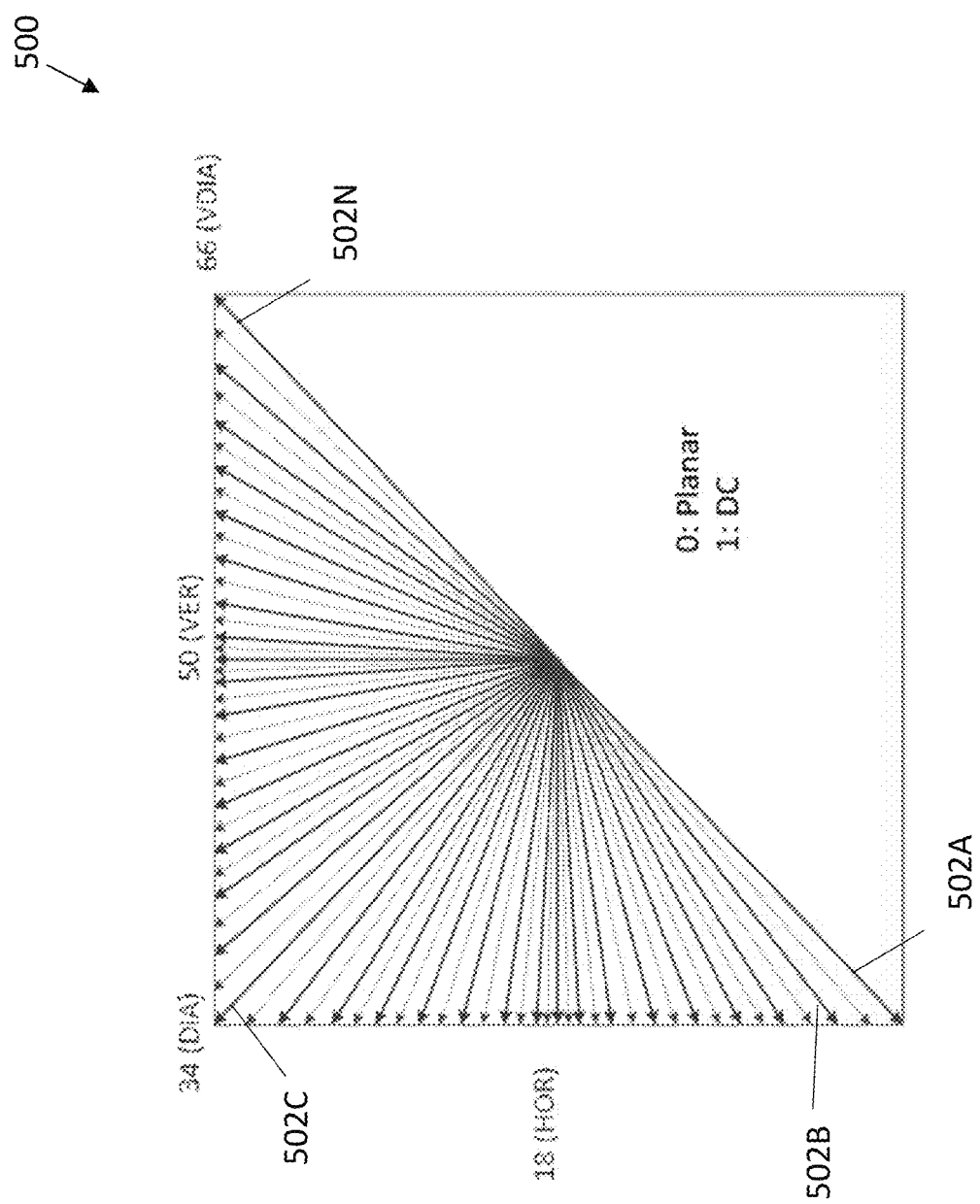
FIG. 5 is a diagram showing the total number of intra prediction directions for a bench-mark test set, according to some examples.

FIG. 5 is a diagram 500 showing the total number of intra prediction directions for BMS. For VTM, only every other mode direction 502A, 502B, 502C through 502N is available. In other words, the remaining mode directions are not valid for the VTM test model. For the BMS test model, the MPM modes and non-MPM modes are coded. The MPM Modes can be coded by generating a list of the six (6) Most Probable Modes (MPM) from the neighboring modes. Truncated unary coding can be used if the prediction mode is one of the modes in MPM list. For Non-MPM modes, if the best prediction mode is not in the MPM list, either fixed length code or truncated binarization method is used to code the mode.

Figure 6:
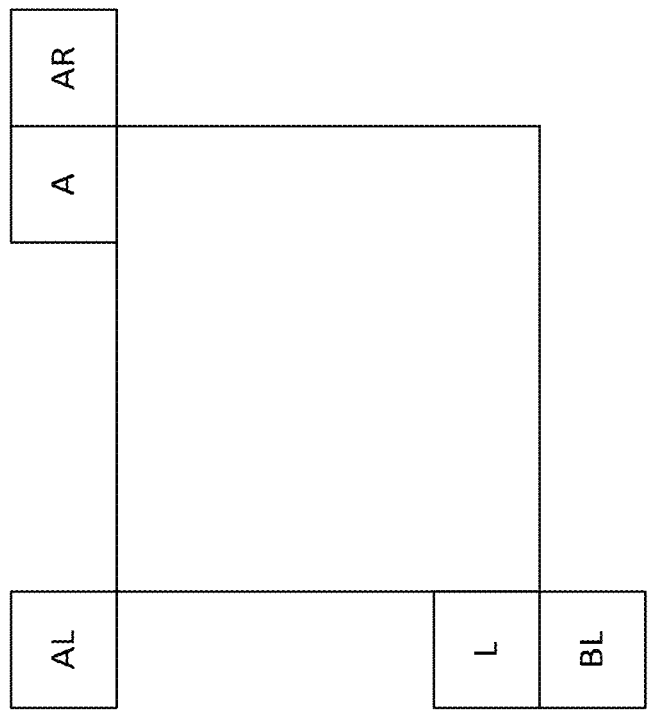
FIG. 6 shows a diagram of the locations of five neighboring modes, according to some examples.

In some examples, to generate the MPM list for the BMS Test Model, the modes included into the MPM lists are classified into three groups: (1) neighbor intra modes, (2) derived intra modes, and (3) default intra modes. Five neighboring intra prediction modes can be used to form the MPM list. The locations of the five neighboring modes, which can be left (L), above (A), below-left (BL), above-right (AR), and above-left (AL), as shown in the diagram 600 in FIG. 6. An initial MPM list can be formed by inserting the five (5) neighbor intra modes and the planar and DC modes into the MPM list. A pruning process can be used to remove duplicated modes so that only unique modes can be included into the MPM list. The order in which the initial modes are included can be: left, above, planar, DC, below-left, above-right, and then above-left.

If the MPM list is not full (e.g., there are less than six MPM candidates in the list), derived modes can be added. These intra modes can be obtained by adding −1 or +1 to the angular modes that are already included in the MPM list. Such additional derived modes are typically not generated from the non-angular modes (e.g., DC or planar).

Finally, if the MPM list is still not complete, the default modes can be added in the following order: vertical, horizontal, mode 2, and diagonal mode. As a result of this process, a list of six MPM modes is generated.

The coding for selection of the remaining sixty-one (61) non-MPMs is done as follows. The sixty-one non-MPMs are first divided into two sets: a selected modes set and a non-selected modes set. The selected modes set contains sixteen (16) modes and the rest (the remaining forty-five (45) modes) are assigned to the non-selected modes set. The mode set that the current mode belongs to can be indicated in the bitstream with a flag. If the mode to be indicated is within the selected modes set, the selected mode can be signaled with a 4-bit fixed-length code, and if the mode to be indicated is from the non-selected set, the selected mode can be signaled with a truncated binary code. The selected modes set can be generated by sub-sampling the sixty-one non-MPM modes as follows:

Selected modes set={0, 4, 8, 12, 16, 20 . . . 60}

Non-selected modes set={1, 2, 3, 5, 6, 7, 9, 10 . . . 59}

According to the techniques described herein, the modes can be classified into two categories, such as MPM and non-MPM. Assume, for example, that N represents the total number of intra modes, and M represents the number of modes in the MPM list. Therefore, N−M is equal to the number of modes in non-MPM list.

In some embodiments, the total number of modes (N) is equal to 67, and the number of MPM (M) is 6. Therefore, the number of non-MPM modes is equal to N−M, which is 61.

In some embodiments, the total number of modes (N) is equal to 67, and number of MPM (M) is 5. Therefore, the number of non-MPM modes is equal to N−M, which is 62.

In some embodiments, to generate the MPM list, the techniques can include using the five neighboring Intra prediction modes to generate the MPM list. The number of elements in MPM list can be M. The neighboring modes can be inserted in the MPM list based on a priority order. For example, the order can be first to add initial modes in the following order: Left Mode (L), Above Mode (A), Planar Mode, DC Mode, Bottom-Left Mode (BL), Above-Right (AR) Mode, and Above-Left Mode (AL). Next, adjacent modes can be added by adding −1/+1 to adjacent modes when total number of modes=67. If the MPM list is not full, the default modes can be inserted in following priority order: planar, DC, vertical, horizontal, mode 2, and diagonal mode.

After generating the MPM list, the techniques can re-order the entire MPM list based on weighting factors. The mode which has highest weight can be placed at index 0 of the MPM list. The mode which has lowest weight can be placed in index (M−1) of the MPM list, where M is the number of elements in the MPM list.

In some embodiments, weighting factors can be specified. For example, according to some embodiments, for Left Mode (L), if (Left Mode≤30), then the weight equals 4, otherwise the weight is equal to 3. For Above Mode (A), if (Above Mode≤1 OR Above Mode≥40) then the weight equals 4, otherwise the weight is equal to 3. For Planar Mode, if Planar Mode is already in the MPM list, then the weight equals 1, otherwise the weight is equal to 3. For DC Mode, if DC Mode is already in the MPM list then the weight equals 1, otherwise the weight is equal to 2. For Bottom-Left Mode (BL), if Bottom Left mode<HOR mode, then the weight equals 2, otherwise the weight is equal to 1. For Above-Right (AR) Mode, if Above right mode≤1 OR Above right Mode≥60, then the weight equals 3, otherwise the weight is equal to 2. For Above-Left Mode (AL), if Above left mode≥30 AND Above left Mode≤38 OR Above left mode≤1, then the weight equals 3, otherwise the weight is equal to 2. For Adjacent Modes, the weight is equal to 1.

As another example, in some embodiments, the weighting factors can include: Left Mode (L), weight=4; Above Mode (A), weight=4; for Planar Mode, if Planar Mode is already in the MPM list), then the weight equals 1, otherwise the weight is equal to 3; for DC Mode, if DC Mode is already in the MPM list, then the weight equals 1, otherwise the weight is equal to 2; Bottom-Left Mode (BL), weight=2; Above-Right (AR) Mode, weight=2, Above-Left Mode (AL), weight=2; Adjacent Modes, weight=1.

In some embodiments, initially the weight of all modes can be initialized to zero. After checking each neighboring and adjacent mode, the weight of the corresponding mode can be accumulated. After generation of N MPM modes, the entire MPM list can be reordered based on the accumulated weights. The mode which has the highest weight can be placed at the lowest index of the MPM list. In some embodiments, the MPM is not be re-ordered.

In some embodiments, the techniques can include a Coding Tree Unit (CTU) limitation to access the above, above-left, and above-right mode in MPM generation. As described herein, the techniques can access the five neighboring (e.g., Left, above, bottom-left, above-right and above-left) blocks to get the neighboring modes. This can require storing the neighboring modes of the entire line in a memory buffer. In order to reduce the line buffer, in some embodiments the techniques can be limited to the access the above, above-right and above-left block if the blocks falls outside of coding-tree-unit (CTU). For example, for Left Mode (L), if the Left block belongs to the same slice, access to the block is allowed, otherwise it is skipped. For Above Mode (A), if the Above block belongs to the same CTU, then access to the block is allowed, otherwise it is skipped. For Bottom-Left Mode (BL), if the Bottom-Left block belongs to same slice, access to the block is allowed, otherwise it is skipped. For Above-Right (AR) Mode, if the Above Right block belongs to the same CTU, then access to the block is allowed, otherwise it is skipped. For Above-Left Mode (AL), if the Above Left block belongs to the same CTU, access to the block is allowed, otherwise it is skipped.

In some embodiments, the techniques address signaling the MPM and non-MPM modes. As described herein, a video encoder signals the intra prediction mode for a current data unit, such as one of the supported intra prediction modes (e.g., the sixty-seven directional/angular modes described in conjunction with FIG. 5 and/or some non-angular intra modes like Planar or DC mode). The supported intra prediction modes can be grouped into either an MPM or non-MPM mode based on the intra prediction modes of the neighboring data units and a predetermined MPM establish process. When the intra prediction mode selected for the current data unit is one of the MPMs, to signal the MPM information of the current data unit, video encoders bypass encoded an MPM index, such that none of bins associated with the MPM information are context coded. The inventors have discovered and appreciated that not using any context coding to signal the MPM information can result in coding inefficiencies, especially for the first bin.

In some embodiments, a flag can be used to indicate either the intra prediction mode of the current data unit is the MPM or non-MPM mode. In some embodiments, the bit can be context coded. In some embodiments, the first bin for the MPM information is context coded and the remaining bins are bypass coded. In some embodiments, the MPM information includes an index and can be binarized by using the truncated unary binarization process (e.g., when the number of MPM modes is five, six, and/or some number). FIGS. 7A-7C show tables 700, 720 and 740, respectively, of binarizations that can be used for six MPM modes, according to some embodiments. FIG. 7D shows table 760 of binarizations that can be used for five MPM modes, according to some embodiments. In some embodiments, the techniques described herein can be configured to context code the first bin and/or other bins of the five or six MPM modes. For example, in some embodiments, for six MPM modes, only the first bin is context coded (e.g., only the first bin in tables 700, 720 and/or 740 are context coded, while the remaining bins are not context coded).

Different signaling can be used to signal non-MPM modes. In some embodiments, truncated unary coding is used for signaling non-MPM modes (e.g., the sixty-one non-MPM modes). In some embodiments, fixed length coding is used for signaling non-MPM modes. For example, a six bin fixed length code can be used to signal the non-MPM modes.

Figure 8A:
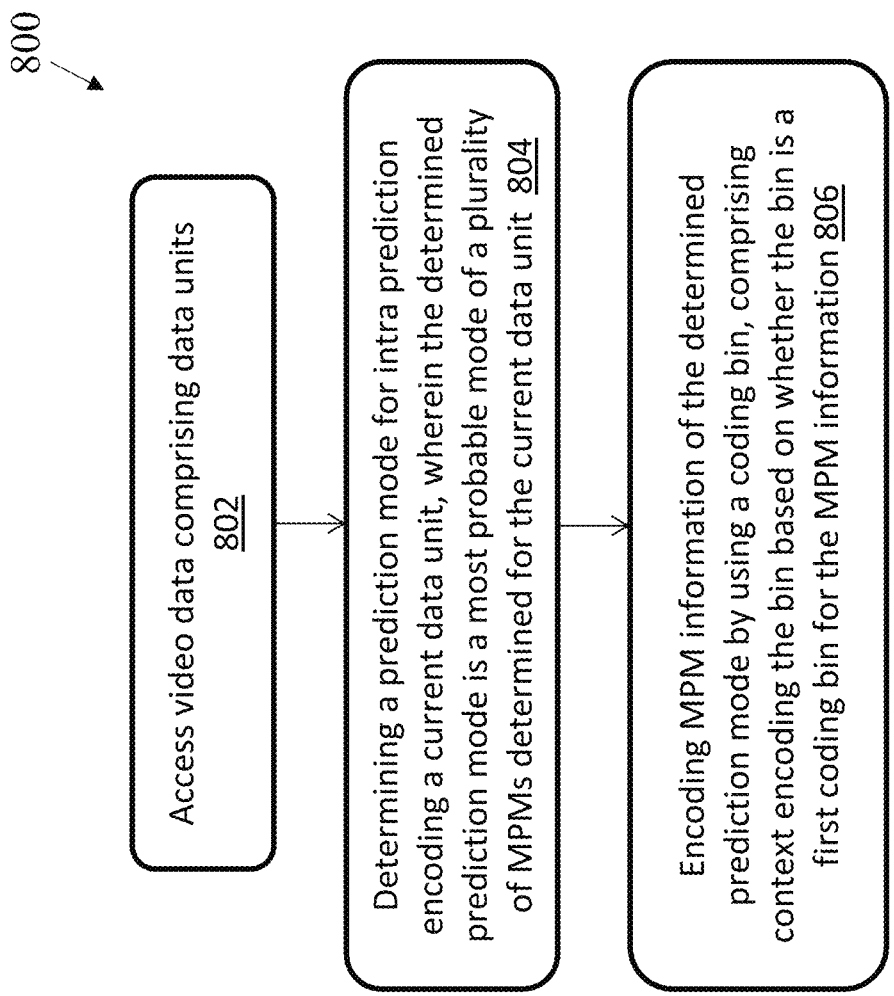
FIG. 8A shows an exemplary computerized method for encoding video data, according to some embodiments.

FIG. 8A shows an exemplary computerized method 800 for encoding video data, according to some embodiments. For example, encoding device 200 shown in FIG. 2, including the entropy coding unit 210, can implement the computerized method 800 to entropy code a determined intra prediction mode used to encode the video data. At step 802, the encoding device access (e.g., receives, accesses, processes) video data that includes a plurality of data units (e.g., CUs). At step 804, the encoding device determines a prediction mode for intra prediction encoding a current data unit that is an MPM in a plurality of MPMs determined for the current data unit. As described herein, a MPM list associated with the plurality of MPMs for the current data unit is established, and each prediction mode in the MPM list has an associated MPM index that indicates the position of the prediction mode in the MPM list. At step 806, the encoding device encodes the MPM information of the determined prediction mode using a coding bin, including context encoding the bin based on whether the bin is a first coding bin for the MPM information. In some embodiments, the MPM information includes an MPM index as described herein, as well as additional information. For example, the MPM information may include one or more flags and/or bits. The additional one or more flags/bits can be coded, such as by using context coding.

Referring to step 806, as described herein, in some embodiments if the coding bin is the first bin of the MPM information, the encoding device context encodes the coding bin. If the coding bin is not the first bin, such that the coding bin is a second or greater bin of the MPM information, the encoding device bypass encodes the coding bin. Consequently, the MPM information is encoded by using context encoding and bypass encoding, and the coding efficiency can be improved. In some embodiments, the encoding device can be configured to use truncated unary binarization to binarize the MPM index.

In some embodiments, as described herein, the encoding device can be configured to encode non-MPM modes using fixed length codes. For example, the encoding device can be configured to use six bit codes, such that the encoding device encodes non-MPM modes by using an associated six bit fixed length code.

In some embodiments, as described herein, the techniques can be used to decode video data. FIG. 8B shows an exemplary computerized method 850 for decoding video data, according to some embodiments. At step 852, the decoding device access coded video data (e.g., bit stream) associated with a plurality of data units. At step 854, the decoding device (e.g., the decoding device 300 shown in FIG. 3) decodes the most probable mode (MPM) information associated with a prediction mode of a current data unit. Decoding the MPM information can include decoding a coding bin that was context encoded based on whether the bin is a first coding bin for the MPM information. That is, the decoding device context decodes the coding bin based on whether the bin is a first coding bin for the MPM information. In some embodiments, if the coding bin is the first bin of the MPM information, the decoding device can context decode the coding bin. In some embodiments, if the coding bin is a second or greater bin of the MPM information, the decoding device can bypass decode the coding bin. Accordingly, the MPM information is decoded by using context decoding and bypass decoding. In some embodiments, the bin associated with the MPM index of the MPM information was processed by using a truncated unary binarization by the encoding device, and the decoding device can perform a truncated unary de-binarization for decoding the MPM index. At step 856, the decoding device can determine the prediction mode for intra prediction decoding the current data unit based on the decoded MPM information.

Figure 9A:
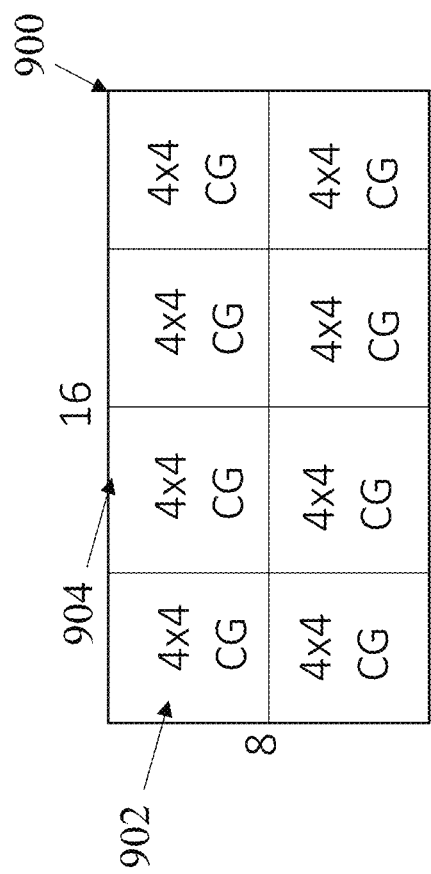
FIG. 9A shows a transformed quantized coding unit divided into coefficient groups, according to some embodiments.

As described in conjunction with FIG. 2, for each CU the encoder performs transform/quantization and then entropy coding. In VVC (e.g., as described in B. Bross, J. Chen, S. Liu, "Versatile Video Coding (Draft 2)," Joint Video Expert Team (JVET) of ITU-T VCEG (Q6/16) and ISO/IEC MPEG (JTC 1/SC 29/WG 11), Doc. JVET-K1001, 11th Meeting: Ljubljana, SI, 10-18 Jul. 2018, which is hereby incorporated by reference herein in its entirety), the coefficient entropy coding of each TU can be processed on a sub-block by sub-block basis. For example, as shown in FIG. 9A, for coefficient coding, a transformed quantized CU 900 can be divided into coefficient groups. As shown, CU 900 is a 16×8 CU that is divided into eight (8) 4×4 coefficient groups, including CG 902 and 904. Separate bit streams can be generated for each CG. A coefficient group can correspond to an N×M sub-block, where N and M can, for example, be any combination of {2, 4, 8, 16, or 32}. For each sub-block (e.g., 4×4 sub-block), a flag called "coded_sub_block_flag" can be signaled first. A value of 0 for the coded_sub_block_flag can mean that all of the coefficients of that sub-block are zero and rest of the process can be skipped for this sub-block. A value of 1 for the coded_sub_block_flag can mean that at least one of the coefficients within the sub-block are non-zero.

In some examples, if the flag "significant_coeffgroup_flag" is equal to one, then all of the coefficients of the specific sub-block can be coded. Pass 1 can include the coding of significance (sig_coeff_flag), parity (par_level_flag), and greater 1 flag (rem_abs_gt1_flag) in coding order. The parity and greater 1 flags are only present if sig_coeff_flag is equal to 1. The context for the greater 1 flag does not depend on the directly preceding parity flag, and the context of the sig_coeff_flag does not dependent on the value of the directly preceding rem_abs_gt1_flag (when the previous sig_coeff_flag is equal to 1). Pass 2 can include the coding of greater 2 flags (rem _abs_gt2_flag) for all scan positions with the rem_abs_gt1_flag equal to 1. The context models do not depend on any data coded in this $2^{nd}$ pass. Pass 3 can include coding of the syntax element abs_remainder for all scan positions with rem _abs_gt2_flag equal to 1. The non-binary syntax element is binarized and the resulting bins are coded in the bypass mode of the arithmetic coding engine. Pass 4 can include coding of the signs (sign_flag) for all scan positions with sig_coeff_flag equal to 1.

According to the techniques described herein, the coefficient entropy coding of each TU is processed on a sub-block by sub-block basis using different techniques. For each sub-block, the coded_sub_block_flag is signaled first. A value of zero for coded_sub_block_flag can mean that all of the coefficients of that sub-block are zero and the rest of the process can be skipped for this sub-block. A value of 1 for coded_sub_block_flag can mean that at least one of the coefficients within this sub-block is non-zero.

In some embodiments, if coded_sub_block_flag equals one, all of the coefficients of this specific sub-block are coded in four passes. For pass 1, for each coefficient the following order can be performed for coding. First, sig_coeff_flag is signaled. A value of sig_coeff_flag equal to zero can mean that the coefficient value is zero and no more flags are signaled. If the value of sig_coeff_flag is equal to one, rem_abs_gt1_flag flags are signaled. Next, if rem_abs_gt1_flag is equal to zero, it can mean that the absolute value of the coefficient is 1 and no additional flags are signaled. If rem_abs_gt1_flag is equal to one, it can mean that the coefficient value is greater than 1 and an additional par_level_flag is used for signaling. Lastly, a value par_level_flag equal to one can mean that the absolute value of the coefficient is odd, otherwise, it is an even value. For pass 2, for all scan positions with rem_abs_gt1_flag equal to 1, a rem _abs_gt2_flag is coded using the regular mode of the arithmetic coding engine. For pass 3, for all scan positions with rem _abs_gt2_flag equal to 1, the non-binary syntax element abs_remainder is coded in the bypass mode of the arithmetic coding engine. For pass 4, for all scan positions with sig_coeff_flag equal to 1, a sign_flag is coded in the bypass mode of the arithmetic coding engine.

Figure 9B:
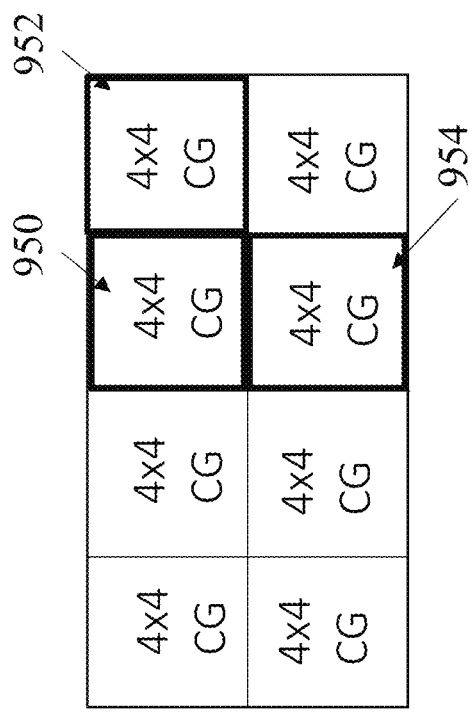
FIG. 9B is a diagram showing how the context model used for a particular coefficient group can depend on the right coefficient group and the lower coefficient group, according to some embodiments.

The techniques described herein can include context modeling for the coded_sub_block_flag. In some embodiments, two context models can be used. As shown in FIG. 9B, the context model used for a particular coefficient group 950 can depend on the coded_sub_block_flag of the right coefficient group 952 and the lower coefficient group 954, according to some embodiments. For example, a bitwise-or operation of the values of the two coded_sub_block_flags of the right and lower coefficient groups 952, 954 (e.g., coded_sub_block_flag$_{lower}$|coded_sub_block_flag$_{right}$) can be used to determine the current context model, where a value of 0 results in using one context model, while a value of 1 results in using a different context model.

Figure 9C:
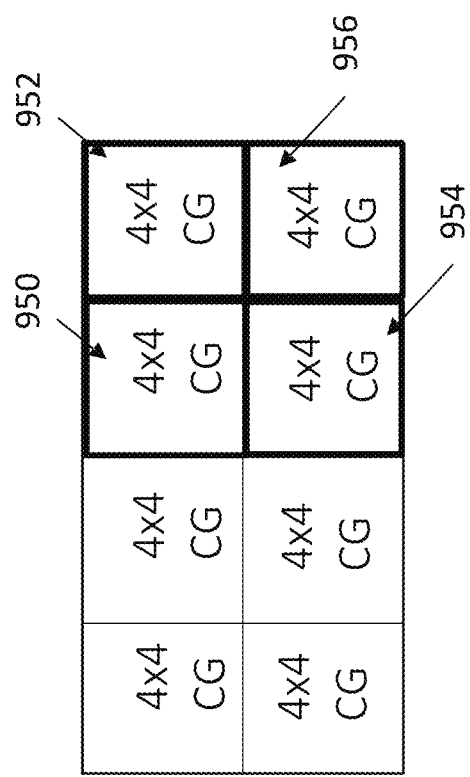
FIG. 9C is a diagram showing how the context model for a flag of a current sub-block can depend on the right sub-block, the lower sub-block, and the right-lower sub-block, according to some embodiments.
Figure 10:
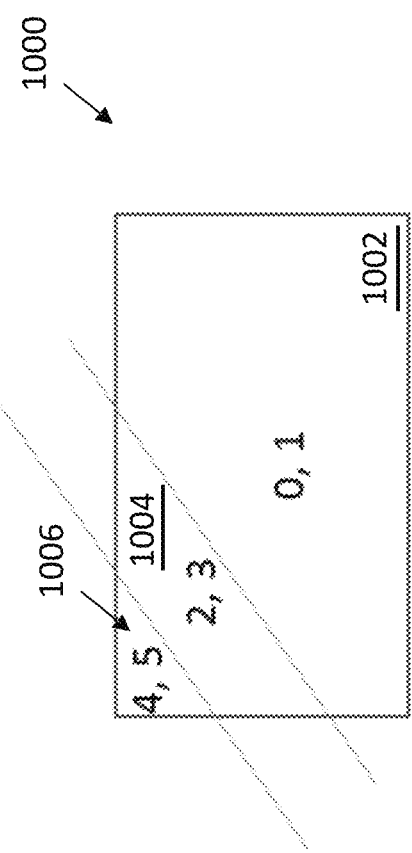
FIG. 10 shows an example of a transform unit divided into three regions with each region having a different set context models, according to some embodiments.

The inventors appreciated that only two context models are often used to code some flags for the coefficient group (e.g., as described in conjunction with FIG. 9B), which can result in coding inefficiencies. In some embodiments, the techniques described herein provide for using more than two context models to code information, such as to code the sub_block_flag. For example, four context models can be used. As shown in FIG. 9C, the context model for the coded_sub_block_flag of a current sub-block 950 can depend on the right sub-block 952, the lower sub-block 954, and the right-lower sub-block 956. For example, the context model can be determined by adding the coded_sub_block_flag of the right, the lower, and the right-lower sub-blocks 952, 954 and 956 (e.g., coded_sub_block_flag$_{lower}$+coded_sub_block_flag$_{right}$+coded_sub_block_flag$_{right-lower}$). As another example, six context models can be used. In some embodiments, a transform unit (TU) can be divided into a plurality of regions and different context models or context sets can be used for different regions. FIG. 10 shows an example of a TU 1000 is divided into 3 regions 1002, 1004 and 1006, and each region has different set context models. As shown for this example, region 1002 can use context models 0 or 1, region 1004 can use context models 2 or 3, and region 1006 can use context models 4 or 5. The context model for a region can be determined based on a bitwise or of the coded_sub_block_flag of the lower and right CG, plus an offset. For example, the context model can be determined as: offset+coded_sub_block_flag$_{lower}$|coded_sub_block_flag$_{right}$. For example, the context model can be determined as: offset+coded_sub_block_flag$_{lower}$+coded_sub_block_flag$_{right}$. In some embodiments, the offset is an integer, such as 0, 1, or 2.

In some embodiments, the techniques can include context modeling for the flags that involves determining the number and/or location of the neighboring coefficient groups to use to determine the context model. The techniques can be used to code various flags such as, for example, to context code the sig_coeff_flag, rem_abs_gt1_flag, abs_level_gt1_flag, par_level_flag, and/or the abs_level_gt3_flag. In some embodiments, the context modelling and binarization can depend on one or more measures of the local neighborhood. For example, one or more of the following measures for the local neighborhood can be used: numSig, which is the number of non-zero levels in the local neighborhood; sumAbs1, which is the sum of partially reconstructed absolute levels (absLevel1) after the first pass in the local neighborhood; and sumAbs, which is the sum of reconstructed absolute levels in the local neighborhood.

For a given position (x, y), absLevel1 can be specified as absLevel1[x][y]=sig_coeff_flag[x][y]+par_level_flag[x][y]+rem_abs_gt1_flag[x][y]. The number of context models, and the derivation of the proposed method can be that as described in Heiko Schwarz, Tung Nguyen, Detlev Marpe, Thomas Wiegand, "Alternative Entropy Coding for Dependent Quantization" JVET-K0072. 11th Meeting: Ljubljana, SI, 10-18 Jul. 2018, which is hereby incorporated by reference herein in its entirety.

Figure 11A:
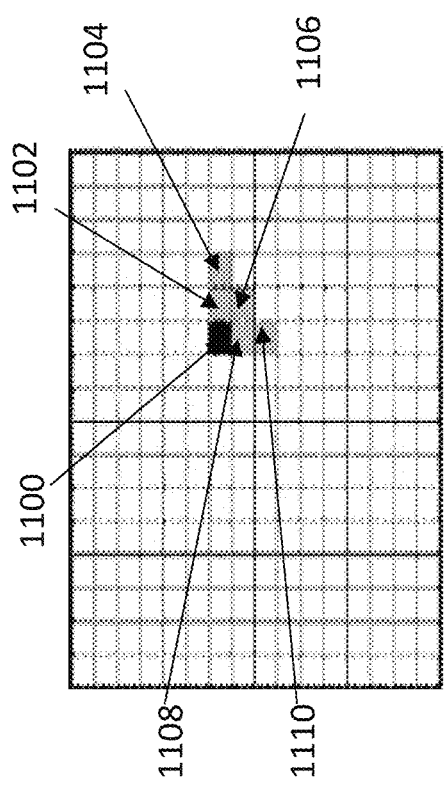
FIG. 11A is a diagram showing that five neighbors to the current coefficient group can be used to determine a context model, according to some embodiments.

In some embodiments, the techniques can provide for the selection of neighbors for context modelling of one or more flags, such as for sig_coeff_flag, rem_abs_gt1_flag, abs_level_gt1_flag, par_level_flag, and/or the abs_level_gt3_flag. In some embodiments, as shown in FIG. 11A, five neighbors 1102-1110 to the current coefficient group 1100 can be used to determine the coefficients (e.g., using numSig, AbsLevel1, and sumAbs). In some embodiments, the number of neighbors used to select the context for coding can depend on the CU type. For example, if a CU uses a transform, then one set of neighbors can be used (e.g., five neighbors, as shown in FIG. 11A), while if the CU uses a transform skip, then a different set of neighbors can be used (e.g., three neighbors). For example, FIG. 11B shows using three neighbors 1102, 1106 and 1108 for the current CU 1100.

Figure 11B:
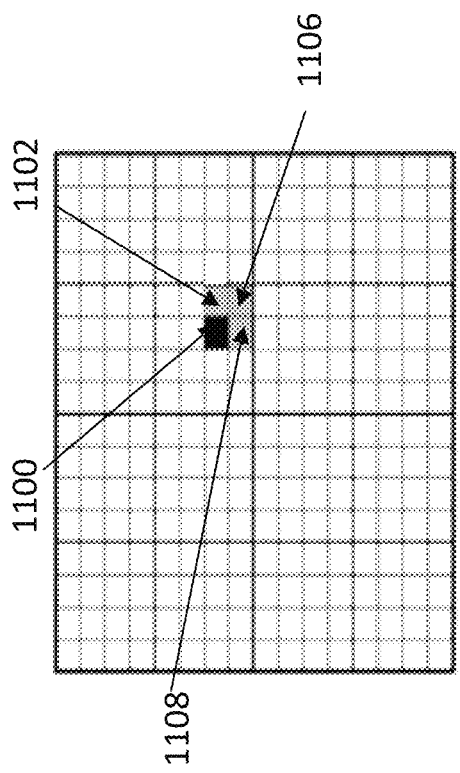
FIG. 11B is a diagram showing that three neighbors to the current coefficient group can be used to determine a context model, according to some embodiments.

In some embodiments, while FIG. 11B shows a certain subset of neighboring CUs 1102, 1106 and 1108 from the five CUs shown in FIG. 11A, this is for exemplary purposes only. In some embodiments, a different sub-set of more or fewer neighbors 1102-1110 in FIG. 11A can be used for context modelling. The number of neighbors and/or which sub-set of neighbors to use can be selected based on one or more constraints. In some embodiments, the number of neighbors and/or which sub-set of neighbors for context selection depends on the color component of the video. In some embodiments, the number of neighbors and/or the sub-set of neighbors for context selection depends on the image slice of the video. For example, different slices can have a different number of neighbors and sub-set of neighbors. In some embodiments, the encoder can signal to the decoder which sub-set of neighbors are used for context selection. In some embodiments, the number of neighbors and/or the sub-set of neighbors for context selection depends on the coding unit (CU). For example, different CUs can have different numbers of neighbors. In some examples, a CU level additional signal can be used to select a specific sub-set from a plurality of sub-sets. In some embodiments, the number of neighbors and/or sub-set of neighbors for context selection can depend on the prediction mode. For example, different prediction modes can have different set of neighbors. In some embodiments, the number of neighbors and/or the sub-set of neighbors for context selection depends on the CU size. In some embodiments, the number of neighbors and/or the sub-set of neighbors for context selection depends on the transform type. In some embodiments, the number of neighbors and/or the sub-set of neighbors for context selection depends on whether the CU is coded using transform skip or not.

Figure 12A:
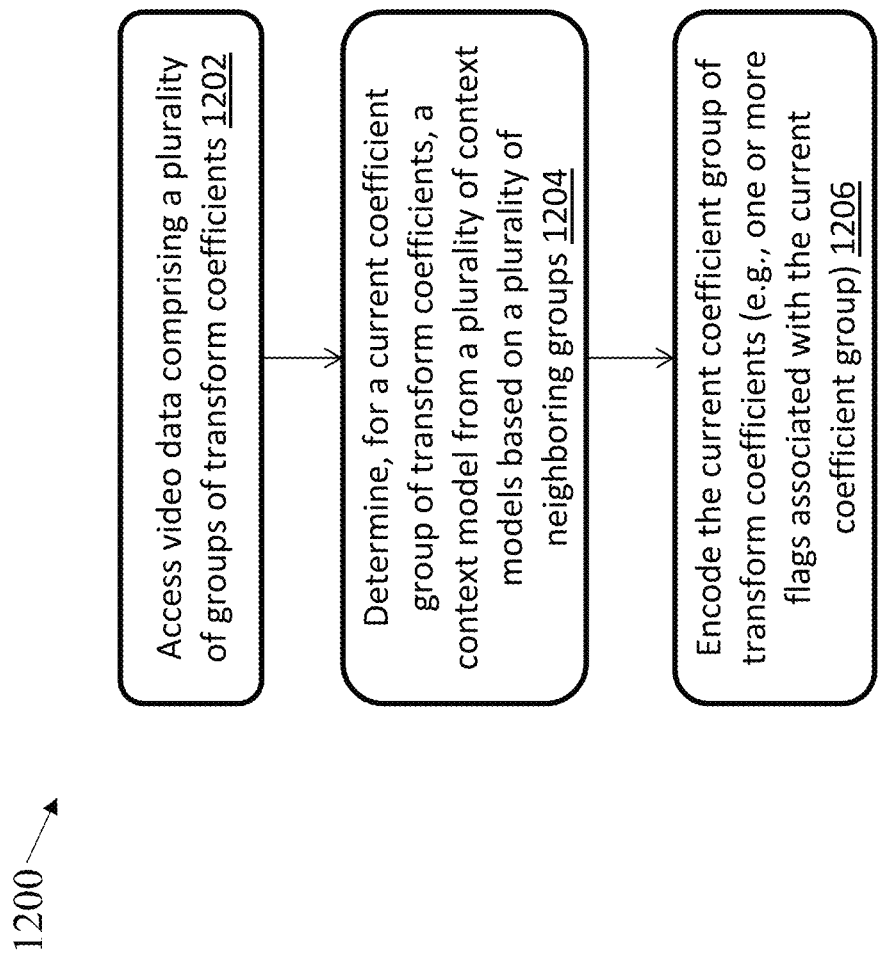
FIG. 12A shows an exemplary computerized method for encoding video data, according to some embodiments.

FIG. 12A shows an exemplary computerized method 1200 for encoding video data, according to some embodiments. For example, encoding device 200 shown in FIG. 2, including the entropy coding unit 210, can implement the computerized method 1200 to entropy code one or more flags for a coefficient group. At step 1202, the encoding device access (e.g., receives, accesses, processes) video data that includes a plurality of coefficient groups, such as a transformed quantized CU divided into a plurality of groups of transform coefficients (e.g., CGs). At step 1204, the encoding device determines, for a current coefficient group of transform coefficients, a context model from a plurality of context models based on a plurality of neighboring groups of transform coefficients. At step 1206, the encoding device encodes the current coefficient group of transform coefficients, such as by encoding one or more flags associated with the current coefficient group. The encoding device can perform this process for a plurality of groups of transform coefficients of the video data.

In some embodiments, the encoding device determines the plurality of neighboring groups of transform coefficients based on whether the current coefficient group of transform coefficients are transform skip coded. In some embodiments, the encoding device can determine a number of the plurality of neighboring groups of transform coefficients, a position of each of the plurality of neighboring groups of transform coefficients, or both, based on whether the current coefficient group of transform coefficients are transform skip coded. For example, as shown in FIG. 11B, the encoding device can determine the context model for the current coefficient group of transform coefficients 1100 based on three neighboring groups of transform coefficients 1102, 1106 and 1108 (e.g., if the current coefficient group of transform coefficients 1100 are transform skip coded). As another example, as shown in FIG. 11A, the encoding device can be configured to determine the context model for the current coefficient group of transform coefficients 1100 based on five neighboring groups of transform coefficients 1102, 1104, 1106, 1108 and 1110 (e.g., if the current coefficient group of transform coefficients 1100 are transform coded).

In some embodiments, the encoding device can determine the context model from four context models using (e.g., as discussed in conjunction with FIG. 9C), determining the context model from six context models (e.g., as discussed in conjunction with FIG. 9D), or some combination thereof.

Referring to step 1206, the determined context model can be used to encode one or more flags. For example, the context model can be used to encode one or more of: a first flag indicative of whether at least one of the transform coefficients of the current coefficient group of transform coefficients have a non-zero value (e.g., a coded_sub_block_flag); a second flag indicative of whether a transform coefficient of the current coefficient group of transform coefficients has a zero value (e.g., a sig_coeff_flag); a third flag indicative of whether the absolute value of a transform coefficient of the current coefficient group of transform coefficients is greater than one (e.g., an abs_level_gt1_flag); a fourth flag indicative of the parity of a transform coefficient of the current coefficient group of the transform coefficients (e.g., a par_level_flag); and/or a fifth flag indicative of whether the absolute value of a transform coefficient of the current coefficient group of transform coefficients is greater than three (e.g., an abs_level_gt3_flag).

Figure 12B:
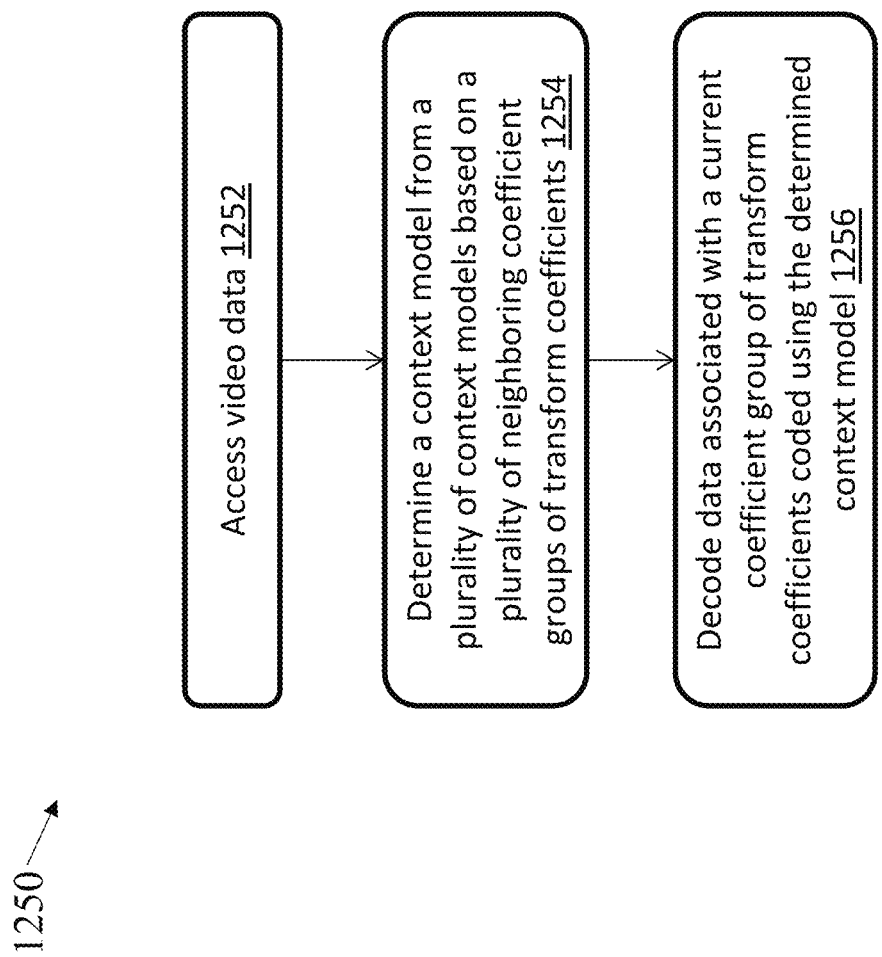
FIG. 12B shows an exemplary computerized method for decoding video data, according to some embodiments.

In some embodiments, as described herein, the techniques can include decoding video data. FIG. 12B shows an exemplary computerized method 1250 for decoding video data, according to some embodiments. For example, decoding device 300 shown in FIG. 3, including the entropy decoding unit 302, can implement the computerized method 1250 to entropy decode one or more flags for a coefficient group. At step 1252, the decoding device accesses video data. At step 1254, the decoding device determines the context model from a plurality of context models based on a plurality of neighboring coefficient groups of transform coefficients. In some embodiments, the decoding device can determine the plurality of neighboring groups of transform coefficients based on whether the current coefficient group of transform coefficients are transform skip coded. At step 1256, the decoding device can decode data associated with a current coefficient group of transform coefficients that was coded using the determined context model.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. An encoding method for encoding video data, the method comprising:
   determining a prediction mode of intra prediction for encoding a current data unit, wherein:
      the determined prediction mode is a most probable mode (MPM) of a plurality of most probable modes (MPMs) determined for the current data unit;
   encoding MPM information of the determined prediction mode, wherein the MPM information comprises an index indicating a position of the MPM in a MPM list associated with the plurality of MPMs, using a sequence of a plurality of coding bins, comprising:
      a first coding bin, wherein the first coding bin is first in the sequence of the plurality of coding bins and wherein the first coding bin is a context coding bin; and
      a second coding bin, wherein the second coding bin is a coding bin directly following the first coding bin in the sequence of the plurality of coding bins and wherein the second coding bin is a bypass encoded bin; and
   encoding residual data associated with a plurality of sub-blocks within a current transform block belonging to the current data unit comprising:
      encoding an indication for each of the plurality of sub-blocks by using context modelling,
      wherein for a sub-block:
         the indication equal to 0 means all transform coefficient levels of the sub-block are inferred to be equal to 0,
         the context modelling was determined from a plurality of context models based on one or more neighboring sub-blocks of current sub-block, and selection of neighboring sub-blocks depends on whether the current transform block was using transform skip or not,
   such that the current data unit can be reconstructed based on the determined prediction mode of intra prediction and the encoded residual data.

2. The method of claim 1, wherein encoding the MPM information using the coding bins comprises, if a coding bin is the second coding bin or follows the second coding bin in the sequence of the plurality of coding bins, bypass encoding the coding bin.

3. The method of claim 1, wherein the index is encoded by using truncated unary binarization.

4. The method of claim 1, further comprising:
   determining a prediction mode of intra prediction coding for a second data unit, wherein:
      the determined prediction mode is not a most probable mode in a current list of a plurality of most probable modes; and
   encoding the determined prediction mode using a fixed length code.

5. A decoding method for decoding video data, the method comprising:
   decoding most probable mode (MPM) information, wherein the MPM information comprises an index indicating a position of a MPM in a MPM list associated with a plurality of MPMs, associated with a prediction mode of a current data unit by decoding a sequence of a plurality of coded bins, the coded bins comprising a first coded bin, wherein the first coded bin is first in the sequence of the plurality of coded bins and wherein the first coded bin is a context coded bin; and
   bypass decoding at least a second coded bin, wherein the second coded bin is a coded bin directly following the first coded bin in the sequence of the plurality of coding bins;
   determining the prediction mode of intra prediction for decoding the current data unit based on the decoded MPM information;
   decoding residual data associated with a plurality of sub-blocks within a current transform block belonging to the current data unit comprising:
      determining an indication for each of the plurality of sub-blocks by using context modelling,
      wherein for a sub-block:
         the indication equal to 0 means all transform coefficient levels of the sub-block are inferred to be equal to 0,
         the context modelling was determined from a plurality of context models based on one or more neighboring sub-blocks of current sub-block, and selection of neighboring sub-blocks depends on whether the current transform block was using transform skip or not; and
   reconstructing the current data unit based on the determined prediction mode of intra prediction and the decoded residual data.

6. The method of claim 5, wherein decoding the MPM information by decoding the coded bins comprises, if a coded bin is the second coded bin or follows the second a coded bin in the sequence of the plurality of coding bins, bypass decoding the coded bin.

7. The method of claim 5, wherein the index is decoded by using truncated unary de-binarization.

8. An apparatus configured to decode video data, the apparatus comprising a processor in communication with memory, the processor being configured to execute instructions stored in the memory that cause the processor to:
   decode most probable mode (MPM) information, wherein the MPM information comprises an index indicating a position of a MPM in a MPM list associated with a plurality of MPMs, associated with a prediction mode of a current data unit by decoding a sequence of a plurality of coded bins, the coded bins comprising a first coded bin, wherein the first coded bin is first in the sequence of the plurality of coded bins and wherein the first coded bin is a context coded bin; and
   bypass decoding at least a second coded bin, wherein the second coded bin is a coded bin directly following the first coded bin in the sequence of the plurality of coding bins;
   determine the prediction mode for intra prediction decoding the current data unit based on the decoded MPM information;
   decode residual data associated with a plurality of sub-blocks within a current transform block belonging to the current data unit comprising:
      determining an indication for each of the plurality of sub-blocks by using context modelling,
      wherein for a sub-block:
         the indication equal to 0 means all transform coefficient levels of the sub-block are inferred to be equal to 0,
         the context modelling was determined from a plurality of context models based on one or more neighboring sub-blocks of current sub-block, and selection of neighboring sub-blocks depends on whether the current transform block was using transform skip or not; and reconstructing the current data unit based on the determined prediction mode of intra prediction and the decoded residual data.

9. The apparatus of claim 8, wherein decoding the MPM information by decoding the coded bins comprises, if a coded bin is the second coded bin or follows the second coded bin in the sequence of the plurality of coding bins, bypass decoding the coded bin.

10. The apparatus of claim 8, wherein the index is decoded by using truncated unary de-binarization.

* * * * *